US012125660B2

(12) United States Patent
Sone

(10) Patent No.: US 12,125,660 B2
(45) Date of Patent: Oct. 22, 2024

(54) X-RAY TUBE AND METHOD OF MANUFACTURING X-RAY TUBE

(71) Applicant: CANON ELECTRON TUBES & DEVICES CO., LTD., Otawara (JP)

(72) Inventor: Junki Sone, Nasushiobara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 276 days.

(21) Appl. No.: 17/657,958

(22) Filed: Apr. 5, 2022

(65) Prior Publication Data

US 2022/0230831 A1 Jul. 21, 2022

Related U.S. Application Data

(63) Continuation of application No. PCT/JP2020/027168, filed on Jul. 10, 2020.

(30) Foreign Application Priority Data

Nov. 11, 2019 (JP) ................................ 2019-203791
Jan. 28, 2020 (JP) ................................ 2020-011831

(51) Int. Cl.
*H01J 35/06* (2006.01)
*H01J 9/18* (2006.01)
(Continued)

(52) U.S. Cl.
CPC ................ *H01J 35/06* (2013.01); *H01J 9/18* (2013.01); *H01J 35/112* (2019.05); *H01J 35/16* (2013.01)

(58) Field of Classification Search
CPC .. H01J 35/06; H01J 35/08; H01J 35/16; H01J 35/112; H01J 9/18
See application file for complete search history.

(56) References Cited

U.S. PATENT DOCUMENTS 6,570,962 B1 5/2003 Maska et al.
7,058,161 B2 * 6/2006 Inazuru .................. H01J 35/16 378/143
(Continued)

FOREIGN PATENT DOCUMENTS

CN 105118761 A 12/2015
CN 106941064 A 7/2017
(Continued)

OTHER PUBLICATIONS

International Search Report issued Oct. 6, 2020 in PCT/JP2020/027168, filed Jul. 10, 2020, 2 pages.
(Continued)

*Primary Examiner* — Jurie Yun
(74) *Attorney, Agent, or Firm* — Oblon, McClelland, Maier & Neustadt, L.L.P.

(57) ABSTRACT

According to one embodiment, an X-ray tube includes an outer envelope that maintains a vacuum inside, an anode target provided inside the envelope and generating X-rays by collision of thermal electrons, and a cathode electron gun provided inside the envelope and emitting thermal electrons toward the anode target, and the X-ray tube includes an envelope assembly including a metal-made cylindrical support fixing portion and constituting the envelope, and an anode assembly including a metal-made support holding the cathode electron gun, and the support of the cathode assembly is fixed to an inner circumferential side thereof by welding.

5 Claims, 5 Drawing Sheets

(51) Int. Cl.

| | |
|---|---|
| ***H01J 35/08*** | (2006.01) |
| ***H01J 35/16*** | (2006.01) |

(56) References Cited

U.S. PATENT DOCUMENTS

| | | | |
|---|---|---|---|
| 2007/0121788 | A1 | 5/2007 | Mildner et al. |
| 2014/0226787 | A1 | 8/2014 | Utsumi et al. |
| 2016/0365218 | A1 | 12/2016 | Takahashi et al. |

FOREIGN PATENT DOCUMENTS

| | | | |
|---|---|---|---|
| JP | 3-245446 | A | 11/1991 |
| JP | 3152717 | B2 | 4/2001 |
| JP | 2005-516367 | A | 6/2005 |
| JP | 2012-79449 | A | 4/2012 |
| JP | 5370967 | B2 | 12/2013 |
| JP | 2016-46145 | A | 4/2016 |
| JP | 2017-4749 | A | 1/2017 |
| WO | WO 2008/120541 | A1 | 10/2008 |

OTHER PUBLICATIONS

Extended European Search Report issued Nov. 11, 2023 in European Patent Application No. 20888561.6, 8 pages.

* cited by examiner

X-RAY TUBE AND METHOD OF MANUFACTURING X-RAY TUBE

CROSS-REFERENCE TO RELATED APPLICATIONS

This application is a Continuation application of PCT Application No. PCT/JP2020/027168, filed Jul. 10, 2020 and based upon and claiming the benefit of priority from Japanese Patent Application No. 2019-203791, filed Nov. 11, 2019; and No. 2020-011831, filed Jan. 28, 2020, the entire contents of all of which are incorporated herein by reference.

FIELD

Embodiments described herein relate generally to an X-ray tubes and a method of manufacturing the X-ray tube.

BACKGROUND

In X-ray tubes for analysis and other applications, the envelope, which maintains a vacuum inside, is made of metal and an insulator such as ceramics, glass or the like. Each of the members of the X-ray tube is joined by brazing, welding, or glass sealing during the assembly process to create a structure that maintains a vacuum. In particular, brazing or welding is used to join ceramic and metal components, and to join metal components to each other.

For each component, the dimensional tolerance is set, but, particularly, in engaging parts and joint parts, backlashes are created. Further, as the dimensional tolerances and the backlashes accumulate in accordance with the number of assembled parts, the focal error with respect to the anode target and the backlash in the distance to the cathode electron gun become significant in the finished shape, which may result in large variations in the shape of the focal point.

The shape of the focal point affects not only the analysis performance but also the lifetime of the X-ray tube. For example, if the focal point is smaller than a necessary size, the X-ray intensity and resolution as analytical performance enhances, but the temperature of the focal plane rises, which accelerates the melting of the focal plane and shortens the lifetime of the X-ray tube. On the other hand, if the focal point is large, the lifetime of the X-ray tube becomes longer, but the X-ray intensity and resolution as resolution performance become lower.

Under these circumstances, there has been a demand for an X-ray tube that can reduce the variation in the shape of the focal point in an anode target spot shape, and a method of manufacturing such an X-ray tube.

One of embodiments described herein aims to provide an X-ray tube that can absorb the effects of the dimensional tolerances of parts and the backlashes during assembly, and reduce the variation of the focal shape in the anode target, and a method of manufacturing such an X-ray tube.

DETAILED DESCRIPTION

Figure 1:
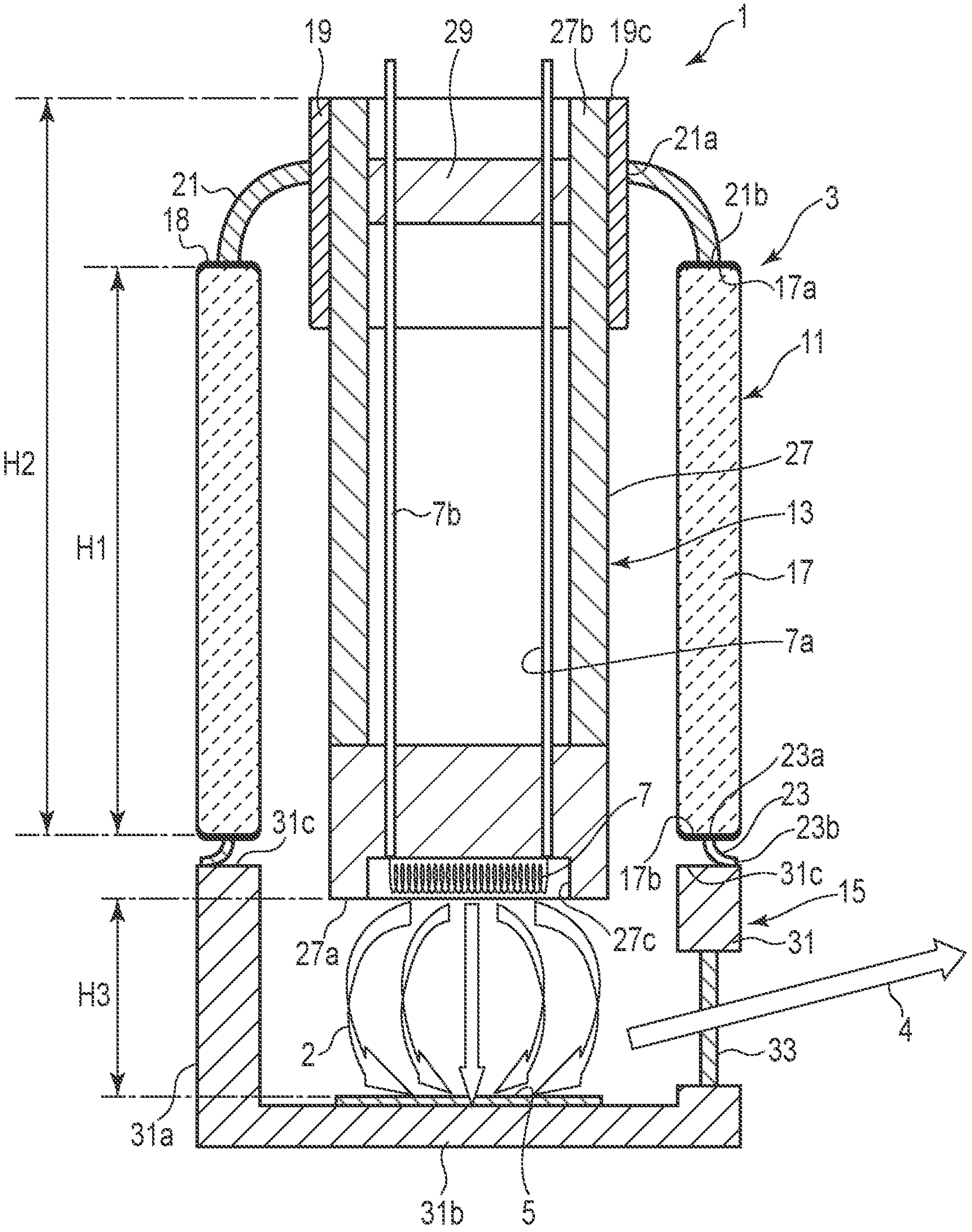
FIG. 1 is a longitudinal cross-sectional view showing a schematic configuration of an X-ray tube according to an embodiment.

In general, according to one embodiment, an X-ray tube comprises an outer envelope that maintains a vacuum inside, an anode target provided inside the envelope and generating X-rays by collision of thermal electrons, and a cathode electron gun provided inside the envelope and emits thermal electrons toward the anode target, and the X-ray tube also comprises a cathode assembly including a metal-made support which holds the cathode electron gun at a distal end thereof, and an envelope assembly including a support fixing portion which fixes the support of the cathode assembly and constituting the envelope, and the support fixing portion being made of a metal into a cylindrical shape, and the support of the cathode assembly being fixed to an inner circumferential side thereof by welding.

According to another embodiment, a method of manufacturing an X-ray tube comprising an outer envelope that maintains a vacuum inside, an anode target provided inside the envelope and generating X-rays by collision of thermal electrons, and a cathode electron gun provided inside the envelope and emits thermal electrons toward the anode target, the X-ray tube comprising: a cathode assembly including a metal-made support which holds the cathode electron gun at a distal end thereof; an envelope assembly including a metal-made support fixing portion which fixes the support of the cathode assembly and a ceramic-made cylindrical envelope body, one end of the envelope body and an outer circumferential surface of the support fixing portion being joined together by a metal-made joint member; and an anode assembly including a metal-made bottomed cylindrical portion which constitutes a part of the envelope, holding the anode target on an inner bottom surface of the bottomed cylindrical portion, and including an X-ray transmission window on a side surface of the bottomed cylindrical portion, and the method comprises an insertion step of inserting the cathode assembly into the support fixing portion of the envelope assembly from the distal end thereof into the envelope assembly, a cathode assembly positioning step of positioning the cathode assembly by, after the insertion step, positioning the distal end of the cathode assembly at a predetermined position, a cathode assembly welding step of fixing by welding, after the cathode assembly positioning step, a rear end of the support of the cathode assembly to the support fixing portion of the envelope assembly.

An X-ray tube and a method of manufacturing the X-ray tube according to one embodiment will be described in detail below with reference to the accompanying drawings. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

As shown in FIG. 1, an X-ray tube 1 comprises an envelope 3 that maintains a vacuum inside, an anode target 5 and a cathode electron gun 7, installed inside the envelope 3, and it generates an X-ray 4 by allowing thermal electrons 2 emitted from the cathode electron gun 7 to collide with the anode target 5.

The X-ray tube 1 is constituted by three assemblies: an envelope assembly 11, a cathode assembly 13, and an anode assembly 15.

Figure 2:
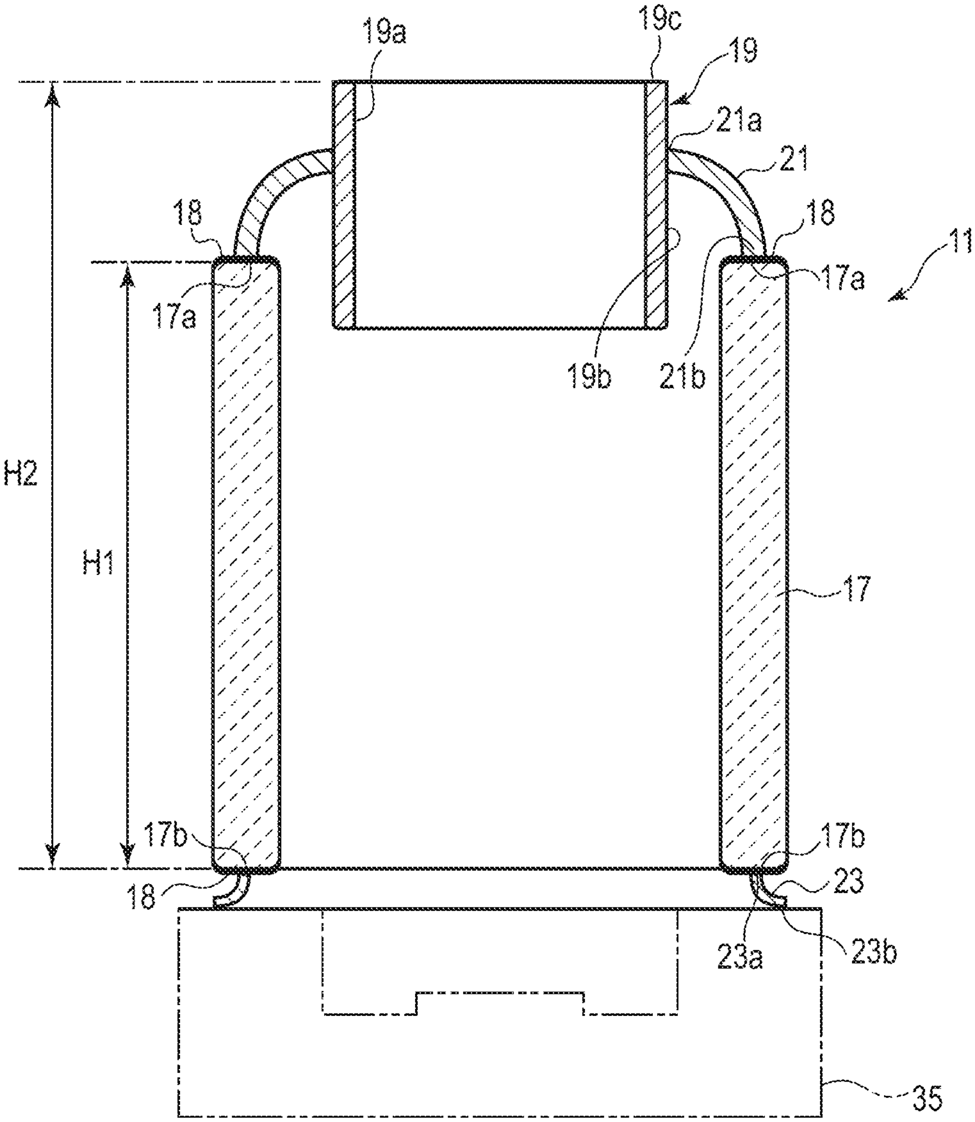
FIG. 2 is a longitudinal cross-sectional view showing a schematic configuration of an envelope assembly shown in FIG. 1.

As shown in FIG. 2 and FIG. 1, the envelope assembly 11 comprises an envelope body 17, a support fixing section 19 that fixes a support member (to be described later) of the cathode assembly 13, a first joint member 21 provided at one end of the envelope body 17 to join the envelope body 17 and the support fixing section 19 together, and a second joint member 23 provided at the other end of the envelope body 17.

The envelope body 17 is made of ceramics into a cylindrical shape. On one end 17*a* and the other end 17*b* of the main body 17, metallizing portions 18 are formed respectively to be formed into metal surfaces.

The support fixing portion 19 is made of stainless steel or the like into a cylindrical shape. As shown in FIG. 1, the cathode assembly 13 is inserted inside the support fixing section 19, and an inner circumferential surface 19*a* of the support fixing section 19 is a sliding surface of the cathode assembly 13.

The first joint member 21 is made of a metal such as Kovar (KOV) and is placed between the one end 17*a* of the envelope body 17 and an outer circumferential surface 19*b* of the support fixing section 19, so as to seal the space therebetween as a part of the envelope 3 (see FIG. 1). This joint member 21 has a ring-like shape.

An end (inner circumferential end) 21*a* of the first joint member 21 on a support fixing section 19 side is brazed to the outer circumferential surface 19*b* of the support fixing section 19. Another end (outer circumferential end) 21*b* of the first joint member 21 on an envelope body 17 side is brazed to the one end 17*a* of the envelope body.

Further, to the other end 17*b* of the envelope body 17, one end 23*a* of the second joint member 23 is brazed. The second joint member 23 is made of a metal such as Kovar (KOV), and is formed into an annular shape along the form of the other end 17*b* of the envelope body 17, and here in this embodiment, it has a ring-like shape.

Figure 3:
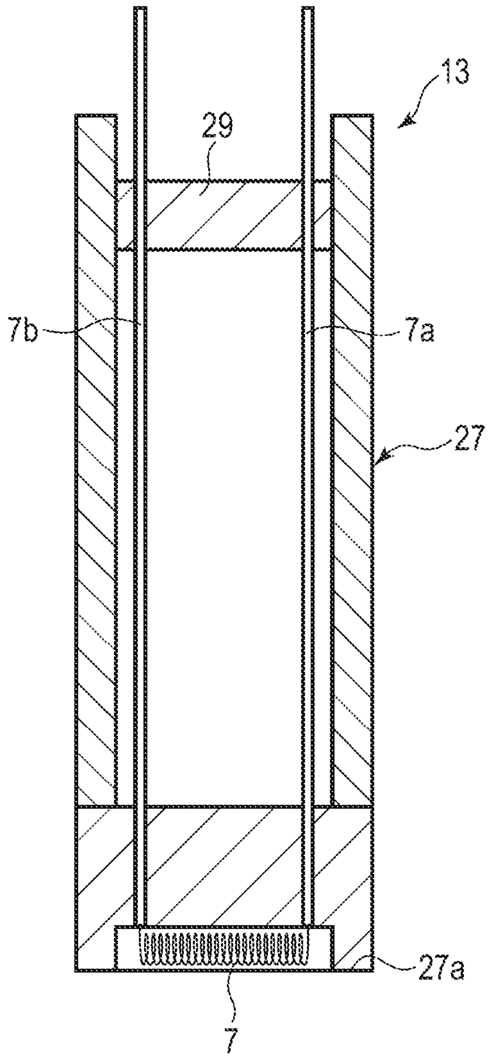
FIG. 3 is a longitudinal cross-sectional view showing a schematic configuration of a cathode assembly shown in FIG. 1.

As shown in FIG. 3 and FIG. 1, the cathode assembly 13 comprises a cathode electron gun 7 and a support 27 which supports the cathode electron gun 7.

The support 27 is made of a metal such as stainless steel into a cylindrical shape, and holds the cathode electron gun 7 at a distal end 27*a* thereof. As shown in FIG. 1, the support 27 is inserted to the inner circumference of the support fixing portion 19 of the envelope assembly 11, and a rear end 27*b* of the support 27 is welded to an outer end 19*c* of the support fixing section 19.

The distal end 27*a* of the support 27 has a concave electron gun holding section 27*c*, where the cathode electron gun 7 is placed, and is flush with the distal end of the cathode electron gun 7 or either side protrudes.

The support 27 has a cylindrical shape, and a ceramic sealing member 29 is provided inside the cylinder at a position corresponding to the support fixing section 19 of the envelope assembly 11. Wires 7*a* and 7*b* of the cathode electron gun 7 pass through the sealing member 29 inside the support 27, and are withdrawn out from the envelope 3.

Figure 4:
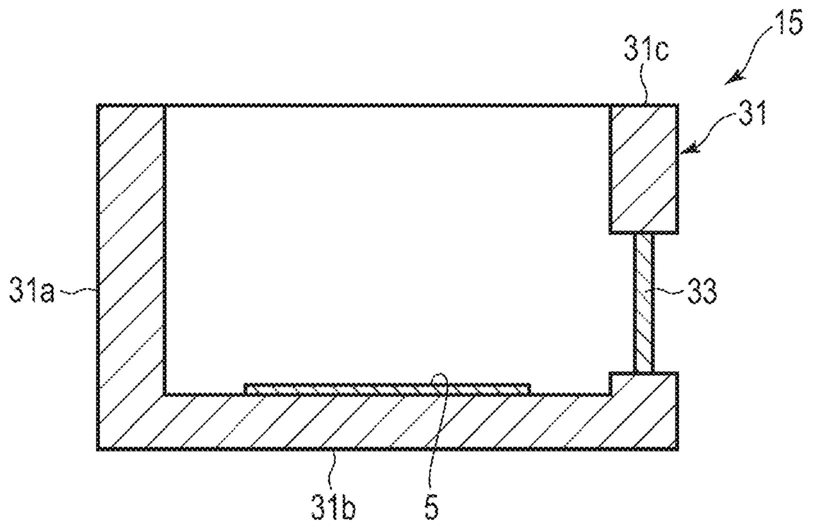
FIG. 4 is a longitudinal cross-sectional view showing a schematic configuration of an anode assembly shown in FIG. 1.

As shown in FIG. 4 and FIG. 1, the anode assembly 15 includes a bottomed cylindrical section 31 made of a metal such as pure copper, which forms part of the envelope 3. The bottomed cylindrical section 31 includes a cylindrical side surface portion 31*a* and a bottom portion 31*b* that seals one end of the cylindrical section, and the anode target 5 is held on the inner bottom surface of the bottom portion 31*b*. In the side surface portion 31*a*, an X-ray transmission window 33 is provided. The X-ray transmission window 33 is made of a light element such as beryllium (Be).

As shown in FIG. 1, to the end surface 31*c* of the bottomed cylindrical section 31, the other end 23*b* of the second joint member 23 is fixed by welding.

Next, a method of manufacturing the X-ray tube 1 of this embodiment will be described.

First, the manufacturing of each of the assemblies 11, 13 and 15 will be described.

As shown in FIG. 2, in the envelope assembly 11, the metallizing portion 18 is formed at each of the one end 17*a* and the other end 17*b* of the cylindrical envelope body 17, and the end (outer circumferential end) 21*b* of the first joint member 21 is positioned to the one end 17*a*, and the one end 23*a* of the second joint member 23 to the other end 17*b* at respective predetermined positions using a jig or the like.

Next, the cylindrical support fixing section 19 is slid into the one end (inner circumferential end) 21*a* of the first joint member 21 and positioned at a predetermined position using a jig or the like. Here, the support fixing section 19 is positioned so that a distance H2 between the other end 17*b* of the envelope body 17 and the outer end 19*c* of the support fixing section 19 becomes a predetermined distance.

After positioning the support fixing portion 19, the one end 17*a* of the cylindrical envelope body 17 and the other end 21*b* of the first joint member 21 are brazed together, and so are between the other end 17*b* of the envelope body 17 and the one end 23*a* of the second joint member 23, and between the one end 21*a* of the first joint member 21 and the outer circumferential surface 19*b* of the support fixing section 19, to be fixed.

As shown in FIG. 3, in the cathode assembly 13, the cathode electron gun 7 is installed at the distal end 27*a* of the support 27, and the wires 7*a* and 7*b* of the electron gun are drawn out of the support 27 through the sealing member 29.

As shown in FIG. 4, the anode assembly 15 is formed into a bottomed cylindrical shape, and the anode target 5 is placed on the inner surface of the bottom portion 31*b*. In the side surface portion 31*a*, the X-ray transmission window 33 is formed.

Next, the assembling of each of the assemblies 11, 13 and 15 will be described.

As shown in FIG. 2, in the envelope assembly 11, a positioning jig 35 is placed on the other end of the envelope body 17. The positioning jig 35 is configured to define the distance between the cathode electron gun 7 of the cathode assembly 13 and the anode target 5 to be a predetermined distance H3 when assembling the cathode assembly 13 and the anode assembly 15 to the envelope assembly 11, as shown in FIG. 1. In order to achieve this, the positioning jig 35 positions the cathode electron gun 7 of the cathode assembly 13 with relative to the envelope assembly 11.

Figure 5:
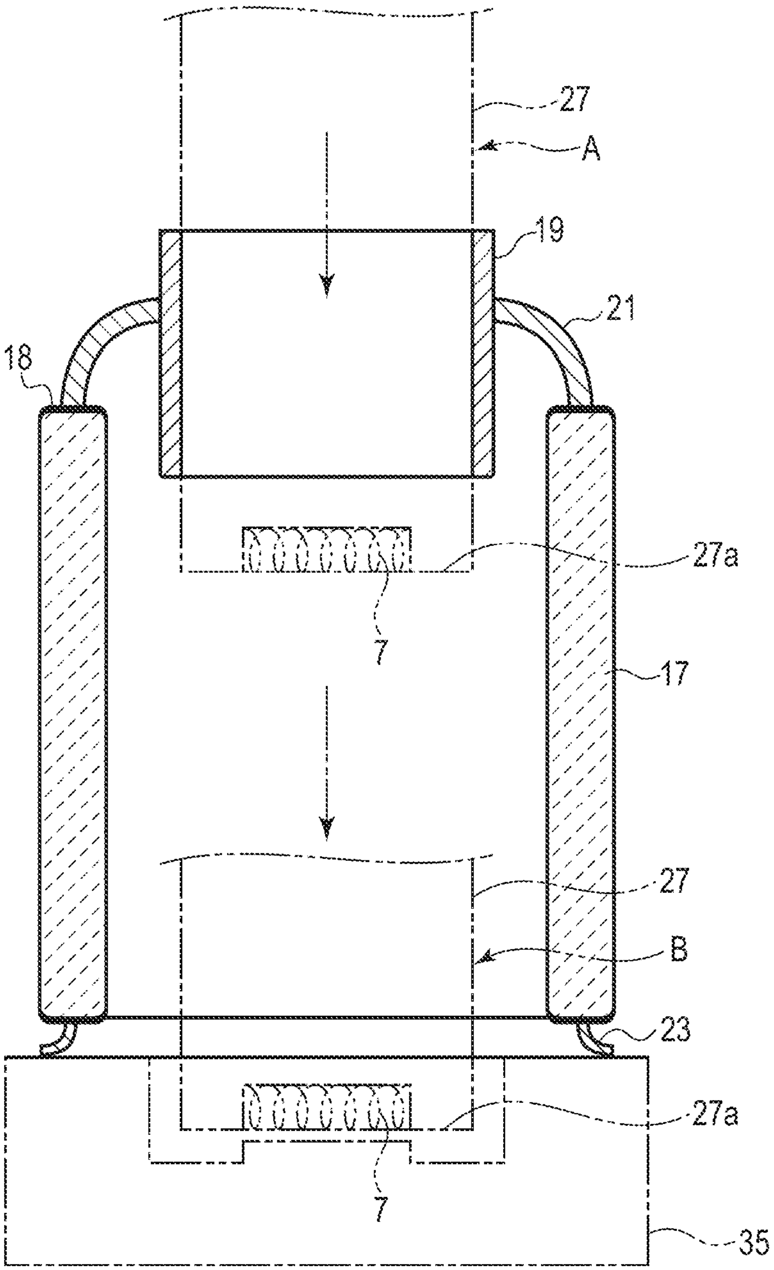
FIG. 5 is a longitudinal cross-sectional view illustrating assembling of the cathode assembly to the envelope assembly.

More specifically, as shown in FIG. 5, the positioning jig 35 is attached to the second joint member 23 of the envelope assembly 11, and as indicated by a reference symbol A in FIG. 1, the support 27 of the cathode assembly 13 is inserted to the inside of the cylindrical support fixing section 19. The support 27 is configured to insert the cathode electron gun 7 to the inside of the envelope body 17.

Next, as indicated by a reference symbol B in FIG. 1, a lower end of the support 27 which holds the cathode electron gun 7 is placed to abut against the positioning jig 35 to position the cathode assembly 13.

As shown in FIG. 1, after positioning the support 27 of the cathode assembly 13 with respect to the support fixing section 19, the rear end 27*b* of the support 27 and the outer end 19*c* of the support fixing section 19 are fixed together at the position by welding.

Next, as shown in FIG. 1, in the envelope body 17 of the envelope assembly 11, the end surface 31*c* of the bottomed cylindrical section 31 of the anode assembly 15 is fixed to the other end 23*b* of the second joint member 23 by welding.

In the above-described manner, the envelope assembly 11, the cathode assembly 13, and the anode assembly 15 are assembled to manufacture the X-ray tube 1.

The function of the X-ray tube 1 will now be described.

As shown in FIG. 1, thermal electrons 2 generated from the cathode electron gun 7 are accelerated by high voltage and collide with the anode target 5 to generate X-rays 4. The thus generated X-rays 4 are extracted through the X-ray transmission window 33 and used for analysis.

The effect of the X-ray tube 1 in this embodiment will now be described.

As shown in FIG. 1, in the envelope 3, the distance H3 between the cathode electron gun 7 and the anode target 5 can be adjusted by positioning the support 27 that holds the cathode electron gun 7 with respect to the support fixation part 19 of the envelope assembly 11 by sliding thereon as shown in FIG. 5. Therefore, it is possible to accurately and easily position the cathode electron gun 7 with relative to the anode target 5.

In particular, by positioning the cathode electron gun 7 directly with respect to the anode target 5, the influence of the dimensional tolerance, if any, on the distance H1 of the ceramic-made envelope body 17 can be reduced.

The positioning of the support 27 that holds the cathode electron gun 7 can be achieved by placing the distal end 27*a* of the support 27 to abut on the positioning jig 35 corresponding to the position of the anode target 5, thereby making it easy to carry out the positioning.

According to this embodiment, the X-ray tube can be manufactured so accurately that the distance between the cathode electron gun 7 and the anode target 5, which affects the shape of the focal point of the X-ray tube is set within an error range of 0.1 mm.

As shown in FIG. 2, in the envelope assembly 11, the support fixing section 19, the envelope body 17, and the first joint member 21 are fixed by brazing. Here, the other end 17*b* of the envelope body 17 and the outer end 19*c* of the support fixing section 19 are positioned to set the distance therebetween to be H2. Thus, the dimensional accuracy of the envelope assembly 11 can be improved, and the distance H3 (see FIG. 1) between the cathode electron gun 7 and the anode target 5 when the cathode assembly 13 is assembled can be further accurately set.

In the X-ray tube 1 of this embodiment, among the parts related to the distance H3 between the cathode electron gun 7 and the anode target 5, which affects the shape of the focal point, those other than the envelope body 17, which is made of ceramics, are all metal parts. Therefore, precise processing and jointing can be easily achieved.

According to this embodiment, the X-ray tube 1 is constituted by three assemblies: an envelope assembly 11, a cathode assembly 13, and an anode assembly 15, and it is assembled while positioning each of the assemblies 11, 13, and 15. Therefore, it is possible to carry out efficient manufacturing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray tube comprising an outer envelope that maintains a vacuum inside, an anode target provided inside the envelope and generating X-rays by collision of thermal electrons, and a cathode electron gun provided inside the envelope and emitting thermal electrons toward the anode target, the X-ray tube comprising:

- a cathode assembly including a metal-made support which holds the cathode electron gun at a distal end thereof, wherein the metal-made support has a cylindrical shape from the distal end to a rear end thereof, and the cathode electron gun is provided on an inner circumferential side of a holding portion of the metal-made support at the distal end;
- an envelope assembly including a support fixing portion which fixes the metal-made support of the cathode assembly and constitutes the envelope; and
- an anode assembly including a metal-made bottomed cylindrical portion which constitutes a part of the envelope, the anode assembly holding the anode target on an inner bottom surface of the bottomed cylindrical portion, and including an X-ray transmission window on a side surface of the bottomed cylindrical portion,
- the support fixing portion of the envelope assembly being made of a metal into a cylindrical shape, and the metal-made support of the cathode assembly being positioned by sliding along an inner circumferential surface of the support fixing portion prior to being fixed thereto by welding,
- the envelope assembly including a ceramic-made cylindrical envelope body, wherein one end of the envelope body and an outer circumferential surface of the support fixing portion is joined together by a metal-made joint member, and
- an opening end of the bottomed cylindrical portion of the anode assembly being fixed to an other end of the cylindrical envelope body.

2. A method of manufacturing an X-ray tube comprising an outer envelope that maintains a vacuum inside, an anode target provided inside the envelope and generating X-rays by collision of thermal electrons, and a cathode electron gun provided inside the envelope and emitting thermal electrons toward the anode target, the X-ray tube including a cathode assembly including a metal-made support which holds the cathode electron gun at a distal end thereof, wherein the metal-made support has a cylindrical shape from the distal end to a rear end thereof, and the cathode electron gun is provided on an inner circumferential side of a holding portion of the metal-made support at the distal end; an envelope assembly including a metal-made support fixing portion which fixes the metal-made support of the cathode assembly and a ceramic-made cylindrical envelope body, one end of the envelope body and an outer circumferential surface of the support fixing portion being joined together by a metal-made joint member; and an anode assembly including a metal-made bottomed cylindrical portion which constitutes a part of the envelope, the anode assembly holding the anode target on an inner bottom surface of the bottomed cylindrical portion, and including an X-ray transmission window on a side surface of the bottomed cylindrical portion, the method comprising:

an insertion step of inserting the cathode assembly into an inside of the support fixing portion of the envelope assembly from the distal end thereof into the envelope assembly;

a cathode assembly positioning step of positioning the cathode assembly by, after the insertion step, sliding the metal-made support along an inner circumferential surface of the support fixing portion so as to position the distal end of the cathode assembly at a predetermined position;

a cathode assembly welding step of fixing by welding, after the cathode assembly positioning step, a rear end of the support of the cathode assembly to the support fixing portion of the envelope assembly.

3. The method of manufacturing an X-ray tube, according to claim 2, further comprising:

a support fixing section positioning step of positioning the support fixing portion at a position relative to the joint member in the envelope assembly.

4. The method of manufacturing an X-ray tube, according to claim 2, wherein the cathode assembly positioning step is performed by placing a positioning jig at the other end of the envelope body to make the distal end of the cathode assembly abut on the positioning jig.

5. The method of claim 4, further comprising:

an anode assembly joint step of joining, after the cathode assembly welding step, an opening end of the bottomed cylindrical portion of the anode assembly to the other end of the envelope assembly.

* * * * *